United States Patent [19]
Jordan

[11] 3,965,609
[45] June 29, 1976

[54] BAITING ARRANGEMENT FOR RODENTS

[76] Inventor: Carmel T. Jordan, 1040 Grandview Ave., Union, N.J. 07083

[22] Filed: May 2, 1974

[21] Appl. No.: 466,149

[52] U.S. Cl. ............................................... 43/131
[51] Int. Cl.² ....................................... A01M 25/00
[58] Field of Search .................. 43/131, 65, 66, 61, 43/132, 121; 46/20, 19

[56] References Cited
UNITED STATES PATENTS

| | | | |
|---|---|---|---|
| 24,771 | 7/1859 | Wetmore | 43/61 |
| 909,797 | 1/1909 | Hicks | 43/61 |
| 1,293,894 | 2/1919 | Ollier | 43/61 |
| 1,321,360 | 11/1919 | Bright | 43/131 |
| 3,015,184 | 1/1962 | Scott et al. | 43/131 |
| 3,676,969 | 7/1972 | Moore | 46/20 |

Primary Examiner—Warner H. Camp
Attorney, Agent, or Firm—Joseph F. Padlon

[57] ABSTRACT

A rodent baiting arrangement in which modular plastic units are assembled to form a feeding station through which rodents may pass and consume poisonous bait therein. The modular units may be assembled for placement along a wall or corner of an interior room or space, while being inaccessible to children and domestic animals. The assembled modules form a passage for the rodents, with feed and water alongside of the passage. The modules have transparent top surfaces to allow inspection of the interior of the modules.

5 Claims, 5 Drawing Figures

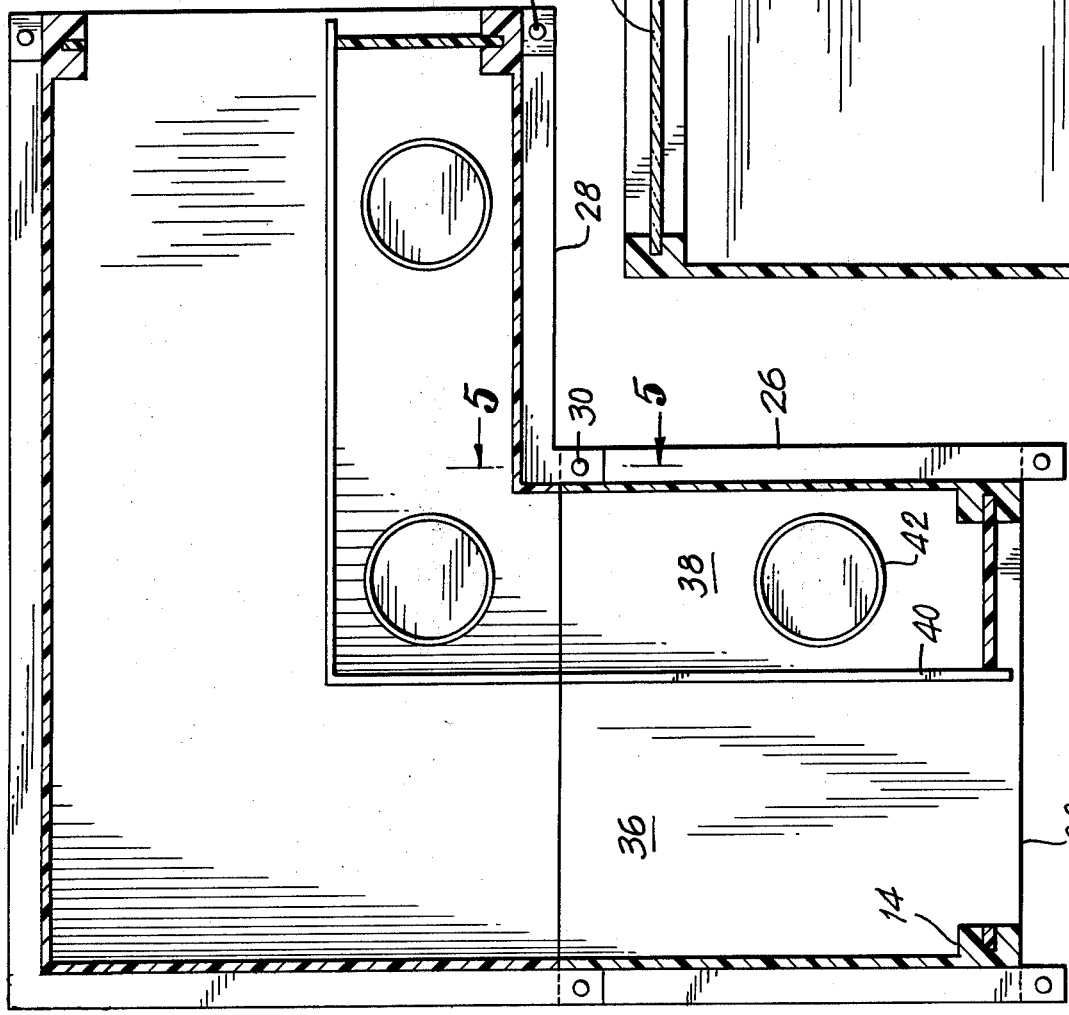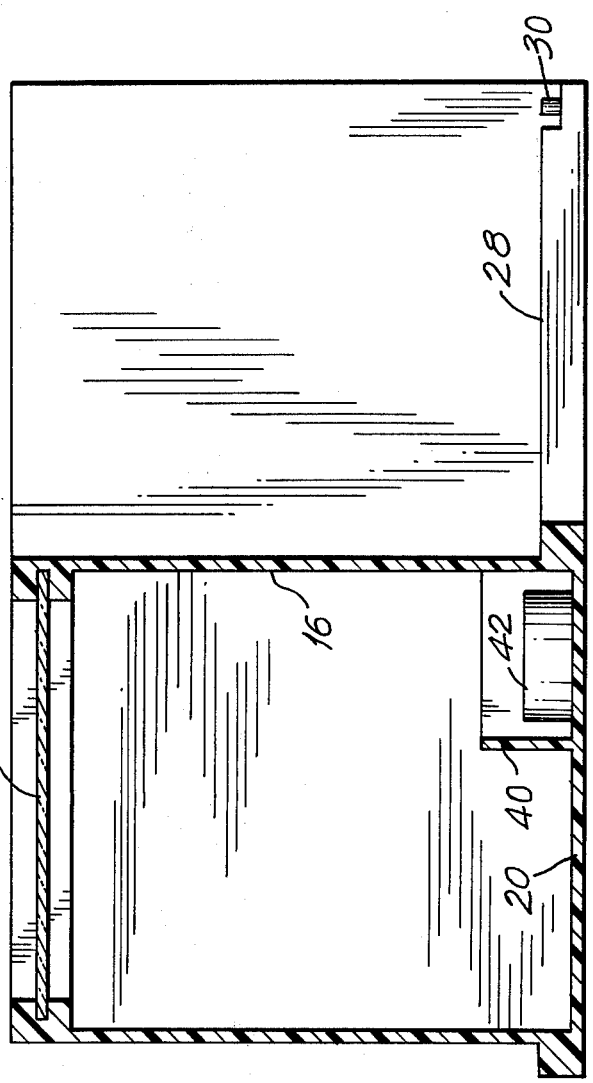

BAITING ARRANGEMENT FOR RODENTS

BACKGROUND OF THE INVENTION

In the control of rodents in residential buildings, restaurants and industrial plants, for example, it is desirable to distribute poisonous bait at locations where rodents are suspected to pass. In the past, such distribution of bait was made in substantially open trays which contained the poison intended for the rodents. The trays were open and the poison was freely exposed so that children and domestic animals were often poisoned as a result of reaching into the corners or locations where such trays were placed with the intention that only rodents have access thereto.

The poisonous bait within the open trays furthermore, would also be spilled and carried from the trays as a result of the actions of cleaning personnel which were not aware of the presence of the poisonous bait. Thus, during cleaning of the floors containing the poisonous bait, for example, a broom or vacuum cleaner would often strike a tray and thereby cause the spillage of the poisonous bait from the tray, and the subsequent dispersion of the bait over a wide area.

Accordingly, it is an object of the present invention to provide an arrangement for containing poisonous bait for rodents within an enclosure so as not to be accessible to children and domestic animals.

Another object of the present invention is to provide a bait arrangement for rodents of the foregoing character, in which rodents may freely pass therethrough without sensing the effects of the enclosure containing the poisonous bait.

A further object of the present invention is to provide a bait arrangement for rodents which is constructed of modular units that may be assembled for adapting the arrangement to placement along a wall or a corner of a room or space.

A still further object of the present invention is to provide a bait feeding arrangement for rodents, as described, which may be simply assembled from modular units without the application of special tools.

It is a particular feature of the present invention to provide a bait feeding arrangement for rodents which may be readily inspected while being inaccessible, at the same time, to children and domestic animals.

SUMMARY OF THE INVENTION

The objects of the present invention are achieved by providing a plurality of modular units of plastic construction which may be assembled readily to conform to a corner of a room or space where the baiting arrangement is to be placed, or to conform to being placed alongside a wall. When assembled, the modular units provide an entrance for the rodent which permits the rodent to pass freely without obstruction through the baiting arrangement. At the same time, the entrance to the baiting arrangement prevents children or domestic animals from entering or having access to the poisons located therein. The arrangement, in accordance with the present invention, is also provided with an exit similar in construction to the entrance.

In passing through the arrangement provided in accordance with the present invention, the rodent has free, unobstructed passage, so that the rodent will not be tempted to bypass the baiting station or arrangement. Alongside the free passage of the rodent, there is located a feeding station containing the bait and water for the rodent. The feeding station is constructed so that the rodent may feed therefrom while passing freely through the modular assembled arrangement. The walls of the modules are opaque and darkened plastics, whereas the tops or roofs of the modules are of transparent plastic plates to enable inspection of the interior of the modules.

The novel features which are considered as characteristic for the invention are set forth in particular in the appended claims. The invention itself, however, both as to its constuction and its method of operation, together with additional objects and advantages thereof, will be best understood from the following description of specific embodiments when read in connection with the accompanying drawings.

BRIEF DESCRIPTION OF THE DRAWING

FIG. 3 is a plan view taken along line 3—3 in FIG. 2;

FIG. 4 is a sectional elevational view taken along line 4—4 in FIG. 1;

DESCRIPTION OF THE PREFERRED EMBODIMENTS

Figure 1:
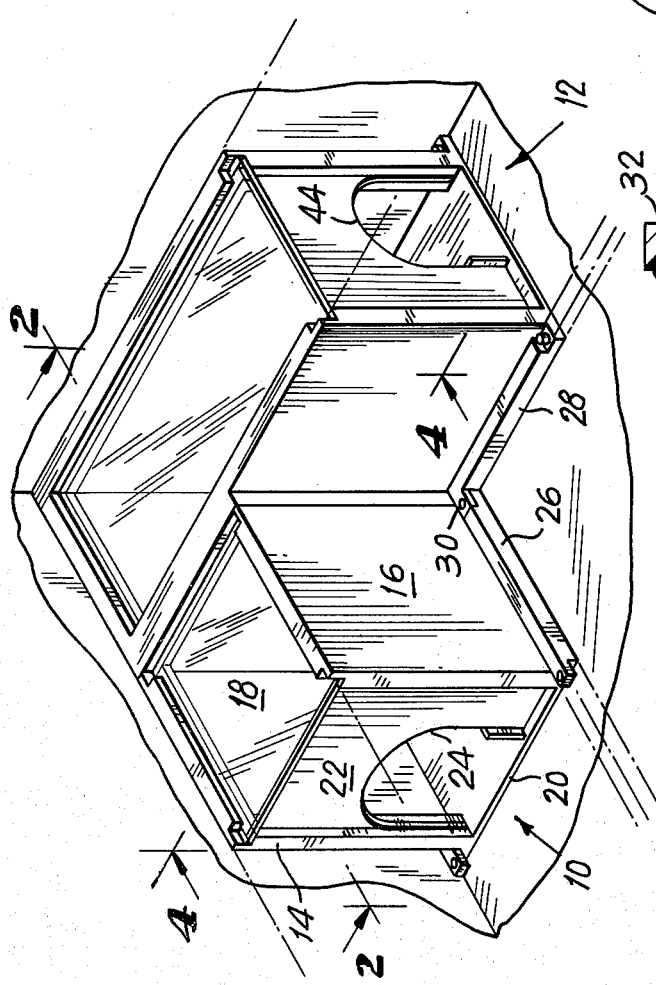
FIG. 1 is a perspective view and shows an assembly of modules conforming to placement at a corner of a room, for example, for feeding rodents with bait therein, in accordance with the present invention.

Referring to the drawing and in particular to FIG. 1, a module 10 is assembled to a module 12 to conform to a right-angle corner of an interior room or space, for example. The module 10 has a frame structure 14 which supports walls 16 and roof top 18. The walls 16 may be integral with the frame 14, or they may be made of separate plates attached to the frame 14 by cement or screws, for example. A floor plate 20 is attached to the bottom of the frame structure 14.

The front wall 22 of the unit 10 has an archshaped entrance 24 which permits the rodent to enter freely without suspecting that the arrangement, in accordance with the present invention, is a baiting station. The walls 16 are made of dark opaque plastic material, which prevents distraction of the rodent while being within the interior of the baiting arrangement.

At the bottom of the unit 10, there are provided base rails 26 which cooperate with similarly constructed base rails 28 of the unit 12. The base rail 26 has integrally formed therewith, a peg 30 which mates with an opening through the rail 28 so as to form an interleaved joint between the units 10 and 12. Thus, the joint between units 10 and 12, formed by rails 26 and 28, is a substantially dove-tail joint.

The roof-top plate 18 supported by the frame structure 14, is made of transparent plastic material. The roof plate 18 slides within slots 32 within top rails 34. With the arrangement of the slots 32 in these top rails 34, it is possible to remove these top plates 18, and to service the interior of the bait arrangement with feed and water and to clean the interior of the units. Such removal of the top plates 18 may be accomplished without disassembling the modular units. At the same time, the transparency of the top plate 18, permits visual inspection of the interior of the assembly, without having to disassemble any parts.

When the arrangement, in accordance with the present invention, is assembled to conform to the corner of a room, for example, the rodent enters the arch-shaped opening 24, and moves along the passage 36 in FIG. 3. Running along the passage 36, is a feed station 38 which is separated from the passage 36 by a wall 40. Within the feed station 38, are located receptacles 42 which contain the poisonous bait for the rodent. The rodent may stretch its head readily over the wall 40, and consumes feed or water from the receptacles 42. For this purpose, the wall 40 extends only for a small distance above the bottom plate 20. The receptacles 42 may be distributed along the feed station 38 which runs substantially parallel to the passage 36, so as to tempt the rodent to nibble or drink from the receptacles 42, while passing through the passage 36.

By locating the feed station 38 along the side of the passage 36, in accordance with the present invention, there is no obstruction present in the passageway of the rodent, since the receptacles 42 are located on the side of the passageway. At the same time, the feed receptacles 42 are sufficiently close to the rodent so that the latter becomes tempted to feed therefrom. The placement of the receptacle 42 in the path of the rodent, for example, might scare the animal, and prevent it from entering the baiting arrangement.

The use of a divider wall 40 for separating the feed station 38 from the passageway 36, in accordance with the present invention, also serves as a safety means because it makes substantially inaccessible, the head of a domestic animal or the hand of a child which might possibly reach through the arch-shaped opening 24. Thus, an animal which might possible stretch its head through the arch-shaped opening 24 would then reach into the passage 36, and would not be in danger of becoming poisoned, if the receptacle 42 were spaced substantially from the entrance opening 24.

After passing through the arch-shaped opening 24, the rodent moves around the corner shaped passage 36, and exits through another arch-shaped opening 44. The two arch-shaped openings 24 and 44 are substantially identical and the rodent may, of course, enter equally well through the arch-shaped opening 44 and exit through the opening 24.

In assembling the two modular units 10 and 12, for example, it is only necessary to tilt somewhat upwards the unit 12 so that the opening in rail 28 can be passed over the peg 30 in the bottom rail 26. This procedure may be seen from the construction of FIG. 5. For this purpose, the bottom rail 26 has a groove 25 at one end, which provides a surface upon which peg 30 may be formed. On the same surface a lip 27 is in contact. The lip 27 is formed from the bottom rail 28 and contains the opening through which peg 30 is inserted. By shaping the ends of the bottom rails 26 and 28, in this manner, these ends may be readily assembled by interleaving them and forming a joint between the modular units, without requiring any special tools for the assembly of these units.

The poisonous material which may be placed within the receptacles 42 as bait for the rodents may be in the form of DDT, warfarin or the compounds commonly known as chlorophacinone or liphadione. Water may also be contained within one of the receptacles 42 placed in the feed station 38.

The walls 16 and vertical frame members 14 may be made integral of molded material, for example, or they may be made separate parts which are fastened to each other by means of conventional fastening devices such as screws or cement, for example.

Figure 2:
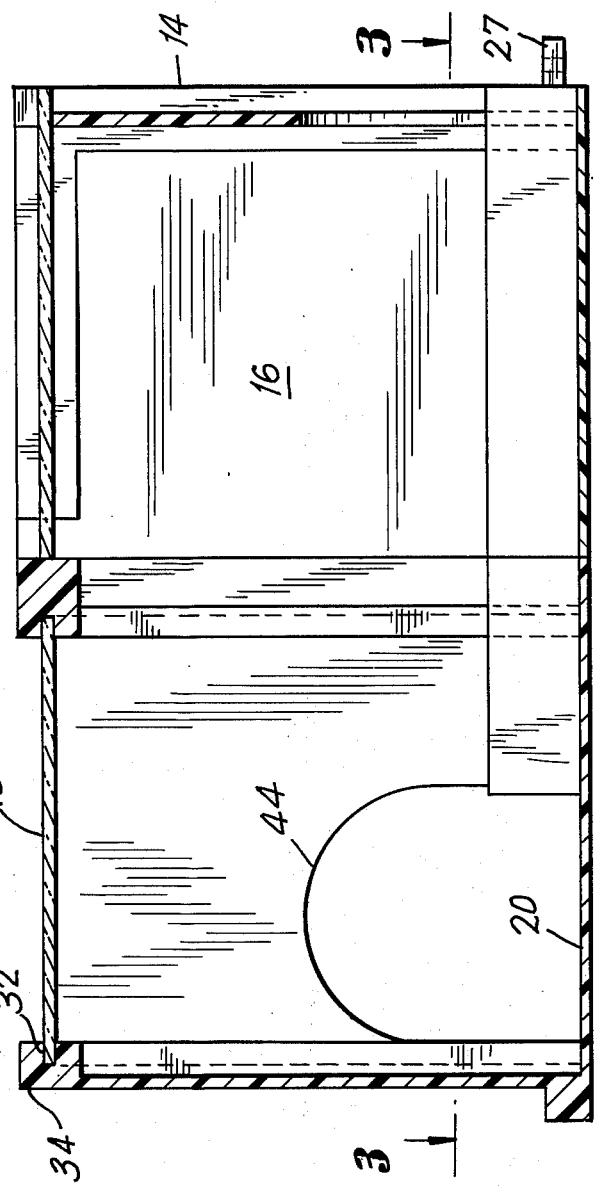
FIG. 2 is a sectional elevational view taken along line 2—2 in FIG. 1.
Figure 5:
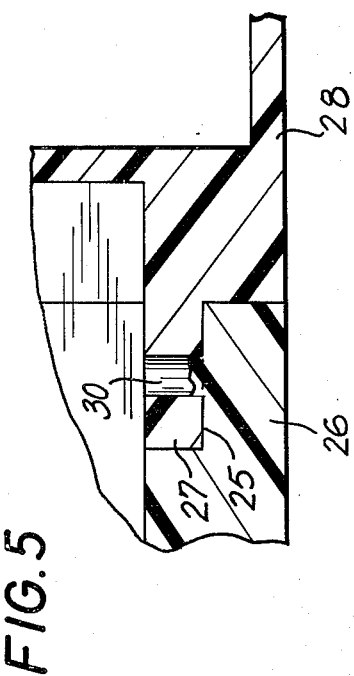
FIG. 5 is a partial sectional view taken along line 5—5 in FIG. 3.

A plurality of modular units 10, for example, may also be interlocked by means of the joints shown in FIG. 5, so as to form a straight-line passage for the rodent along a wall. The walls of the arrangement, such as the walls 16, may be made of dark plastic material such as bakelite, vulcanized plexiglass.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A bait feeding arrangement for rodents comprising, in combination, a first modular housing of assembled permanently rigid elements having an entrance wall with an entrance opening for admitting a rodent; a second modular housing of assembled permanently rigid elements connected to said first modular housing and having an exit wall with an exit opening through which said rodent may leave; interlocking connecting means on said first and second housings for connecting said housings; passage means connecting said entrance opening and said exit opening, said rodent being confined to move along said passage means in traveling from said entrance opening to said exit opening, said housings being located along a wall surface; and poison feed means within said first and second modular housings and containing feed for said rodent, said feed means extending substantially along said passage means connecting said entrance opening and said exit opening, said feed means extending along one side of said passage means and in substantially close proximity thereof; said feed means being spaced from said entrance opening and said exit opening to be inaccessible from said openings, said feed means being accessible to said rodent only after said rodent has entered substantially the interior of said passage means, said interlocking connecting means comprising a plurality of pegs on one of said housings, and a plurality of openings on the other one of said housings, said pegs being inserted into said openings for interlocking said housings to each other; a plurality of rail members at the bottom of said one housing for supporting said pegs, said pegs being formed on a lip-shaped portion on said rails of said one housing; and a plurality of auxiliary rails on the other one of said housings at the bottom thereof for containing said openings, said openings being arranged within lip-shaped portions in said rails at the bottom of said other one of said housings, said lip portions of said first and second modular housings overlapping when said pegs are inserted into said openings; a transparent plate-shaped member at the top of said first and second modular housings, said first and second modular housings having slots at the top portions of said housings for retaining said transparent plate-shaped member, said transparent plate-shaped member being removable from said housings by sliding out of said slots; and a dividing wall within each of said housings for separating said feed means from the passage along which said rodent passes through said housings.

2. The arrangement as defined in claim 1 wherein said entrance opening and said exit opening are arch-shaped.

3. The arrangement as defined in claim 2, wherein the interior of said modular housings when interconnected form a right-angle passage for said rodent, said feed means comprising a parallel passage substantially narrower than the passage moved through by said rodent.

4. The arrangement as defined in claim 3, wherein said modular housings are of substantially plastic material.

5. A bait feeding arrangement for rodents comprising, in combination, a first modular housing of assembled permanently rigid elements having an entrance wall with an entrance opening for admitting a rodent; a second modular housing of assembled permanently rigid elements connected to said first modular housing and having an exit wall with an exit opening through which said rodent may leave; interlocking connecting means on said first and second housings for connecting said housings; passage means connecting said entrance opening and said exit opening, said rodent being confined to move along said passage means in traveling from said entrance opening to said exit opening, said housings being located along a wall surface; and poison feed means within said first and second modular housings and containing feed for said rodent, said feed means extending substantially along said passage means connecting said entrance opening and said exit opening, said feed means extending along one side of said passage means and in substantially close proximity thereof; said feed means being spaced from said entrance opening and said exit opening to be inaccessible from said openings, said feed means being accessible to said rodent only after said rodent has entered substantially the interior of said passage means; said interlocking connecting means including a plurality of pegs on one of said housings; a plurality of openings on the other one of said housings, said pegs being inserted into said openings for interlocking said housings to each other; a plurality of rail members at the bottom of said one housing for supporting said pegs, said pegs being formed on a lip-shaped portion on said rails of said one housing; a plurality of auxiliary rails on the other one of said housings at the bottom thereof for containing said openings, said openings being arranged within lip-shaped portions in said rails at the bottom of said other one of said housings, said lip portions of said first and second modular housings overlapping when said pegs are inserted into said openings; a transparent plate-shaped member at the top of said first and second modular housings, said first and second modular housings having slots at the top portions of said housings for retaining said transparent plate-shaped member, said transparent plate-shaped member being removable from said housings by sliding out of said slots; a dividing wall within each of said housings substantially coextensive with said rodent passage for separating and protecting said feed means from the passage along which said rodent passes through said housings, said entrance opening and said exit opening being arch-shaped, the interior of said modular housings when interconnected form a right-angle passage for said rodent, said modular housings being of substantially plastic material; and at least one auxiliary housing connected to one of said first and second modular housings.

* * * * *